US008701250B2

(12) United States Patent
Anderson et al.

(10) Patent No.: US 8,701,250 B2
(45) Date of Patent: Apr. 22, 2014

(54) HINGE ASSEMBLY FOR VEHICLE INTERIOR TRIM COMPONENT

(75) Inventors: Rick A. Anderson, Grand Haven, MI (US); Timothy J. Borgeson, Hudsonville, MI (US); Brent D. Rockafellow, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 85 days.

(21) Appl. No.: 13/143,864

(22) PCT Filed: Jan. 8, 2010

(86) PCT No.: PCT/US2010/020535
§ 371 (c)(1),
(2), (4) Date: Oct. 5, 2011

(87) PCT Pub. No.: WO2010/081030
PCT Pub. Date: Jul. 15, 2010

(65) Prior Publication Data
US 2012/0017397 A1    Jan. 26, 2012

Related U.S. Application Data

(60) Provisional application No. 61/143,680, filed on Jan. 9, 2009.

(51) Int. Cl.
*E05C 17/64* (2006.01)
(52) U.S. Cl.
USPC ............................................. 16/342; 16/341
(58) Field of Classification Search
USPC ........... 16/342, 348, 357–361, 312, 315, 318; 296/37.7, 97.1–97.13; 725/75
See application file for complete search history.

(56) References Cited

U.S. PATENT DOCUMENTS

| 2,132,266 | A | * | 10/1938 | Lefevre ........................ 16/361 |
| 4,715,644 | A | | 12/1987 | Lobanoff et al. |
| 4,981,348 | A | | 1/1991 | Prillard |
| 4,993,772 | A | | 2/1991 | Charen |
| 5,468,061 | A | * | 11/1995 | Fries et al. ................... 312/258 |
| 6,622,345 | B2 | * | 9/2003 | Liu et al. ....................... 16/357 |

(Continued)

FOREIGN PATENT DOCUMENTS

| EP | 0207777 A2 | 1/1987 |
| EP | 0402242 A1 | 12/1990 |

(Continued)

OTHER PUBLICATIONS

European Patent Office Communication Pursuant to Article 94(3) EPC mailed Oct. 1, 2012.

(Continued)

*Primary Examiner* — Victor Batson
*Assistant Examiner* — Matthew Sullivan
(74) *Attorney, Agent, or Firm* — Fletcher Yoder, P.C.

(57) ABSTRACT

A hinge assembly is provided that includes a follower and a cam disposed adjacent to the follower. The cam is capable of translating relative to the follower along a vertical direction and rotating relative to the follower about a rotational axis. The hinge assembly also includes an axle disposed through the cam to facilitate rotation of the cam about the rotational axis. The axle is configured to bias the cam toward the follower along the vertical direction.

20 Claims, 13 Drawing Sheets

(56) References Cited

U.S. PATENT DOCUMENTS

| | | | | |
|---|---|---|---|---|
| 8,108,969 | B2* | 2/2012 | Ochiai | 16/334 |
| 2003/0056327 | A1* | 3/2003 | Lin et al. | 16/342 |
| 2004/0134033 | A1* | 7/2004 | Raines et al. | 16/342 |
| 2006/0098446 | A1 | 5/2006 | Barker et al. | |
| 2009/0300883 | A1* | 12/2009 | Vitito et al. | 16/341 |
| 2012/0023704 | A1* | 2/2012 | Case | 16/321 |

FOREIGN PATENT DOCUMENTS

| | | |
|---|---|---|
| JP | H0811532 | 1/1996 |
| JP | H0899528 | 4/1996 |
| JP | H0977108 | 3/1997 |

OTHER PUBLICATIONS

PCT Notification of Transmittal of the International Search Report and the Written Opinion of the International Searching Authority, or the Declaration mailed Apr. 26, 2010.

First Office Action from the State Intellectual Property Office dated Apr. 3, 2013.

* cited by examiner

HINGE ASSEMBLY FOR VEHICLE INTERIOR TRIM COMPONENT

CROSS REFERENCE TO RELATED APPLICATION

This application claims priority from and the benefit of U.S. Provisional Application Ser. No. 61/143,680, entitled "SUN VISOR VANITY MIRROR COVER", filed Jan. 9, 2009, which is hereby incorporated by reference in its entirety.

BACKGROUND

The invention relates generally to a hinge assembly for a vehicle interior trim component.

Many vehicles employ sun visors to shield occupants from sunlight which may otherwise distract the occupants during operation of the vehicle. For example, certain vehicles include sun visors positioned adjacent to a top portion of the windshield to facilitate access by a driver and/or front passenger. Many sun visors include a vanity mirror attached to an inner face of the sun visor which is visible to occupants when the visor is in a deployed position. In certain configurations, a cover may be employed to conceal and protect the vanity mirror when not in use. For example, the vanity mirror cover may be attached to the sun visor by a hinge that enables the cover to selectively expose and conceal the mirror via rotation of the cover with respect to the visor.

As will be appreciated, typical rotating vanity cover assemblies include a hinge assembly configured to bias the cover toward the open position as the cover approaches the open position and/or to bias the cover toward the closed position as the cover approaches the closed position. In this manner, the hinge assembly may hold the cover in the open and/or closed positions despite movement of the vehicle. Unfortunately, typical hinge assemblies configured to bias the cover toward the open and/or closed positions are expensive to manufacture and assemble due to the number of parts typically employed for such configurations. In addition, such hinge assemblies may be unsuitable for use in thinner and/or lighter sun visors because they employ bulky components such as springs, pins, and other relatively large parts.

BRIEF DESCRIPTION OF THE INVENTION

The present invention relates to a hinge assembly including a follower and a cam disposed adjacent to the follower. The cam is capable of translating relative to the follower along a vertical direction and rotating relative to the follower about a rotational axis. The hinge assembly also includes an axle disposed through the cam to facilitate rotation of the cam about the rotational axis. The axle is configured to bias the cam toward the follower along the vertical direction.

The present invention also relates to a hinge assembly including a follower, and a cam having an opening positioned about a rotational axis of the cam and a bearing surface configured to contact the follower. The hinge assembly also includes an axle disposed through the opening to facilitate rotation of the cam about the rotational axis. The axle is configured to bias the cam toward the follower along a vertical direction, and a portion of the bearing surface is contoured such that contact between the follower and the bearing surface induces the cam to rotate.

The present invention further relates to a hinge assembly including a follower, and a cam having an opening positioned about a rotational axis of the cam and a bearing surface configured to contact the follower. The hinge assembly also includes an axle disposed through the opening to facilitate rotation of the cam about the rotational axis. The axle is configured to bias the cam toward the follower. The hinge assembly further includes an axle support configured to enable the axle to translate in a vertical direction relative to the follower such that contact between the bearing surface and the follower induces the cam to translate along the vertical direction in response to cam rotation.

DRAWINGS

DETAILED DESCRIPTION

Figure 1:
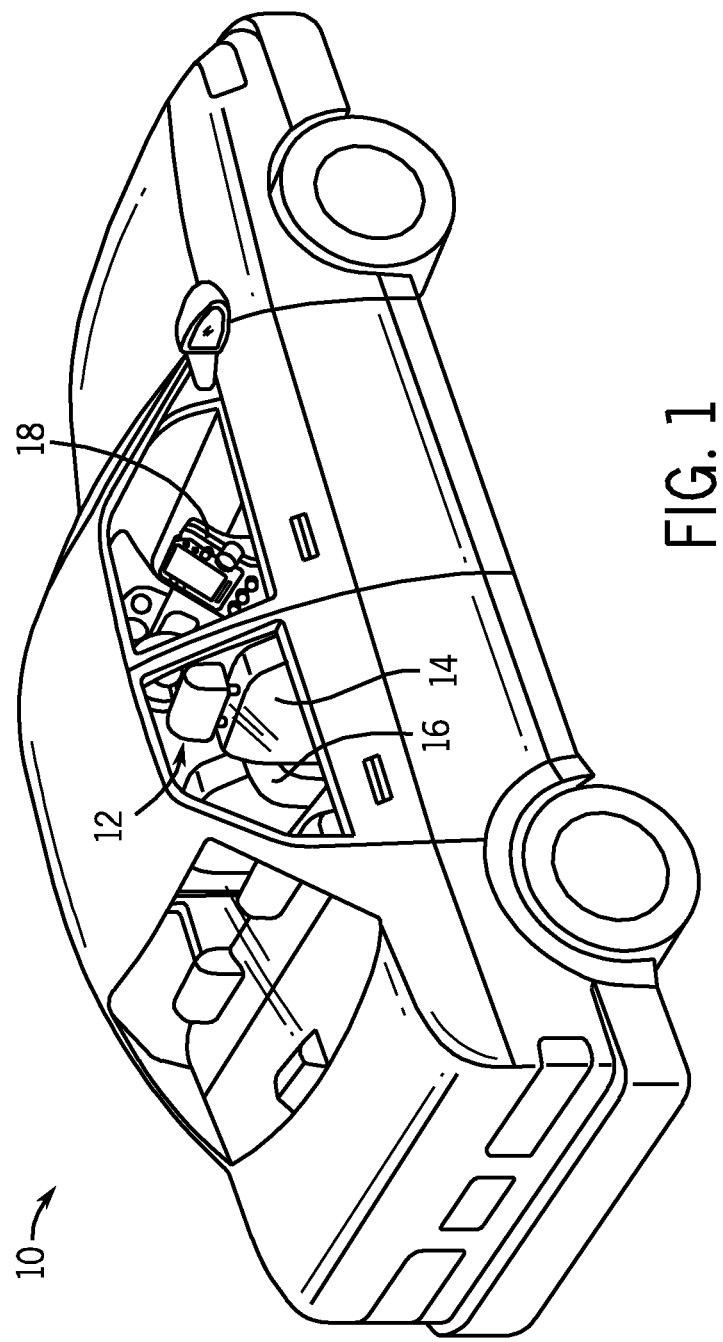
FIG. 1 is a perspective view of an exemplary vehicle that may include one or more sun visors having vanity mirror covers.

FIG. 1 is a perspective view of a motor vehicle 10 including one or more sun visors having vanity mirror covers. As illustrated, the vehicle 10 includes an interior 12 having a seat 14, an armrest 16 and a center console 18. As discussed in detail below, the seat 14, the armrest 16, the center console 18, or other areas within the vehicle interior 12 may include doors configured to rotate with respect to a base structure. For example, in certain embodiments, the vehicle 10 may include sun visors configured to shield vehicle occupants from sunlight. As will be appreciated, certain sun visor configurations include a vanity mirror having a cover configured to conceal the mirror when not in use. Certain vanity mirror covers are configured to rotate with respect to the sun visor to selectively expose and conceal the mirror. As will be appreciated, such vanity mirror covers include a hinge to facilitate rotation, which may be configured to bias the cover toward the closed and/or open positions.

Certain embodiments of the present disclosure are configured to reduce the manufacturing costs, size and/or weight of hinge assemblies configured to bias the vanity mirror cover toward the open and/or closed positions. For example, certain hinge assemblies include a follower and a cam disposed adjacent to the follower. The cam may be connected to a first surface such as the vanity mirror cover, while the follower is coupled to a second surface such as the visor. The cam is capable of translating relative to the follower along a vertical direction and rotating relative to the follower about a rotational axis. The hinge assembly also includes an axle disposed through the cam to facilitate rotation of the cam about the rotational axis. The axle is configured to bias the cam toward the follower along the vertical direction. In certain configurations, the cam is contoured such that contact between the follower and a first portion of the cam induces the cam to rotate in a first direction, and contact between the follower and a second portion of the cam induces the cam to rotate in a second direction, opposite the first direction. In this manner, the force applied by the axle to the cam rotationally biases the cover toward the open and/or closed positions.

Figure 2:
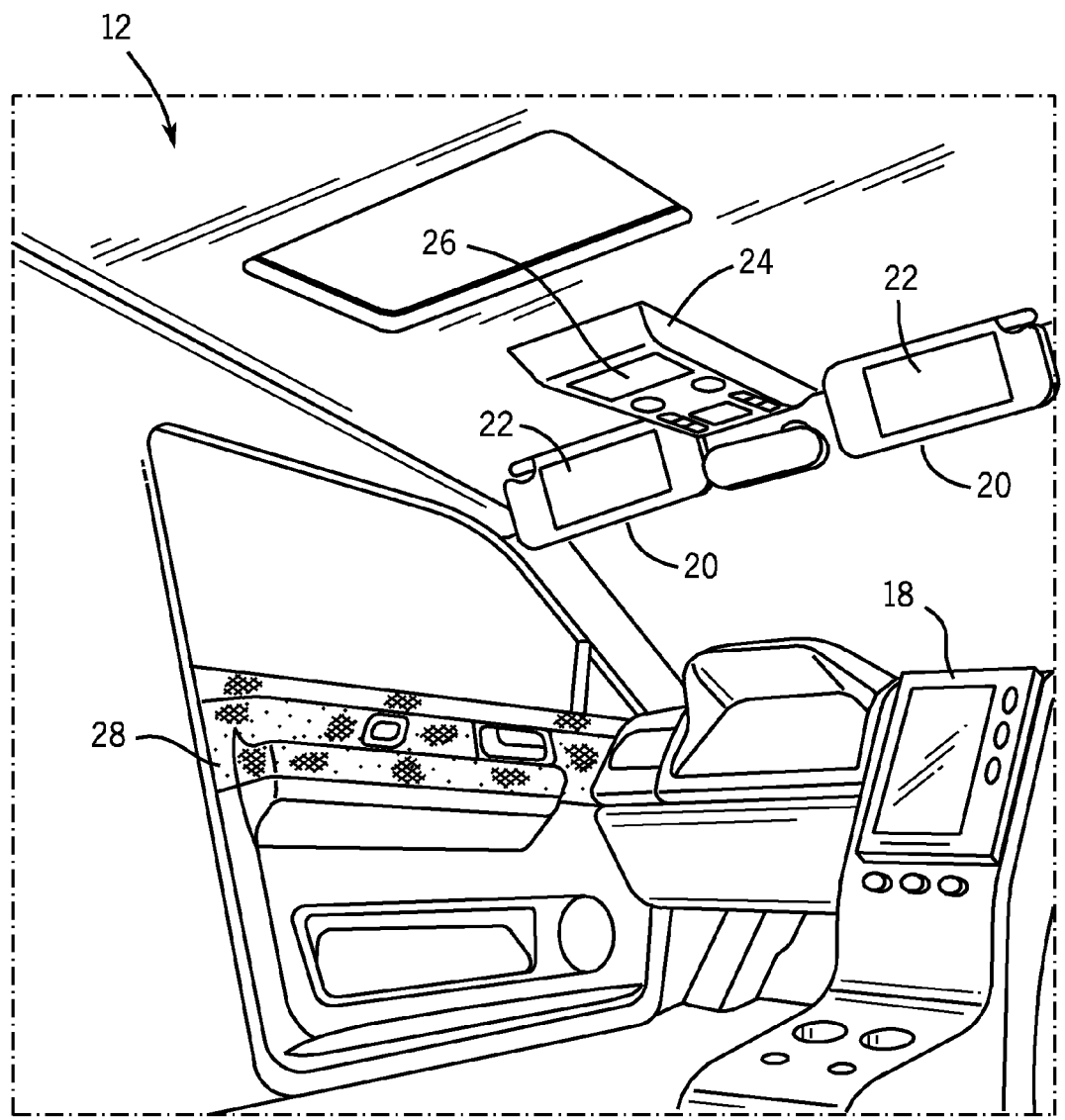
FIG. 2 is a perspective view of a part of the interior of the vehicle of FIG. 1.

FIG. 2 is a perspective view of a part of the interior 12 of the vehicle 10 of FIG. 1. As illustrated, the vehicle interior 12 includes a sun visor 20 with a vanity mirror cover 22. As discussed in detail below, the vanity mirror cover 22 is configured to rotate about a hinge assembly between an open position and a closed position. The hinge assembly employs certain unique features configured to bias the cover 22 toward the open and/or closed positions while reducing manufacturing costs and/or weight compared to typical configurations. As will be appreciated, the sun visor 20 may include other components including lights, controls, displays, etc.

In addition, the hinge assembly described below may be employed within other areas of the vehicle interior 12. For example, an overhead console 24 includes a storage compartment 26, such as a bin for housing sunglasses. In certain configurations, the storage compartment 26 may include a rotatable door configured to enclose the compartment 26. Such configurations may employ a hinge mechanism similar to the embodiments described below. For example, the hinge mechanism may function to bias the door toward the closed position as the door approaches the closed position and/or to bias the door toward the open position as the door approaches the open position. It should also be appreciated that the hinge assembly described below may be employed within other devices or machines unrelated to vehicle interiors 12.

Figure 3:
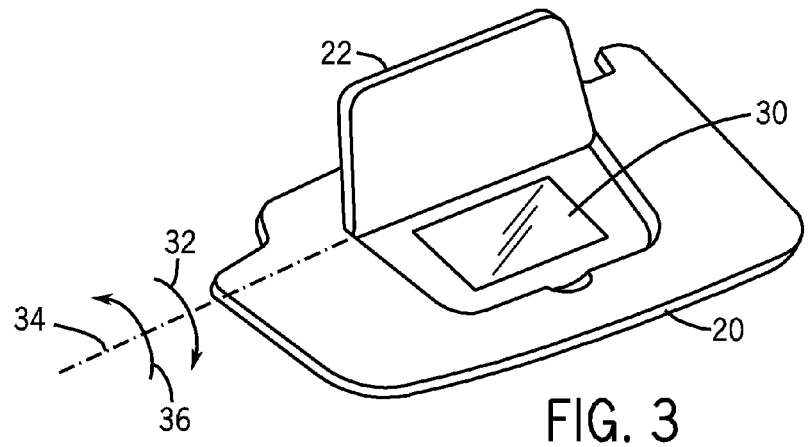
FIG. 3 is a perspective view of an exemplary sun visor having a vanity mirror cover that may employ a hinge having a biased rotation axle.

FIG. 3 is a perspective view of an exemplary sun visor 20 having a vanity mirror cover 22 that may employ a hinge having a biased rotation axle. As illustrated, the vanity mirror cover 22 is in an open position exposing a mirror 30 within the visor 20. As discussed in detail below, the hinge assembly may include certain features configured to bias the cover 22 toward the open position, thereby maintaining the cover 22 in the open position despite movement of the vehicle 10. When an occupant desires to close the cover 22, the occupant may rotate the cover 22 in the direction 32 about a rotational axis 34. Because the cover 22 may be biased toward the open position, the occupant may have to overcome the bias to close the cover 22. However, at a certain point during rotation in the direction 32, the hinge assembly may transition to biasing the cover 22 toward the closed position. Such a configuration may maintain the cover 22 in the closed position during operation of the vehicle 10. The vanity mirror cover 22 may be opened by rotating the cover 22 in a direction 36 about the rotational axis 34. As discussed in detail below, the hinge assembly may employ a biased rotation axle and a cam/follower configured to enable rotation of the cover 22 and establish the biases toward the open and closed positions.

Figure 4:
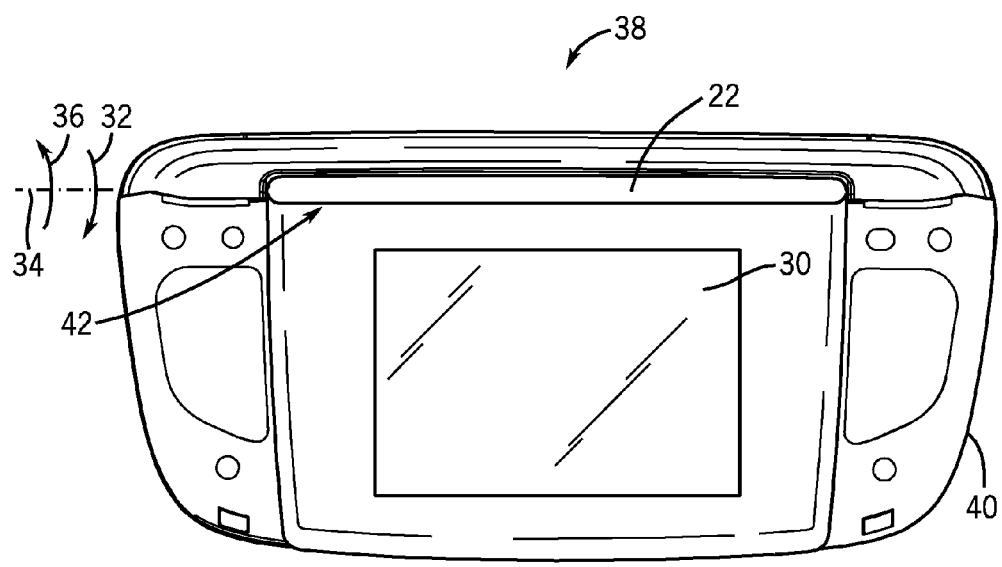
FIG. 4 is a perspective view of a vanity mirror assembly that may be utilized within the sun visor shown in FIG. 3.

FIG. 4 is a perspective view of a vanity mirror assembly 38 that may be utilized within the sun visor 20 shown in FIG. 3. As illustrated, the vanity mirror assembly 38 includes a frame 40 which may be secured (e.g., bonded, adhesively joined, bolted, etc.) to a body of the visor 20. The frame 40 serves to support the mirror 30 and the cover 22. As previously discussed, a hinge assembly 42 serves to secure the cover 22 to the frame 40 while enabling rotation of the cover 22 with respect to the frame 40. As discussed in detail below, the hinge assembly 42 also functions to bias the cover 22 toward the closed position as the cover 22 approaches the closed position, and to bias the cover 22 toward the open position as the cover 22 approaches the open position. In addition, the hinge assembly 42 is configured to hold the cover 22 in the closed position and the open position during operation of the vehicle 10 despite vibration and/or other forces and moments applied to the visor 20.

Figure 5:
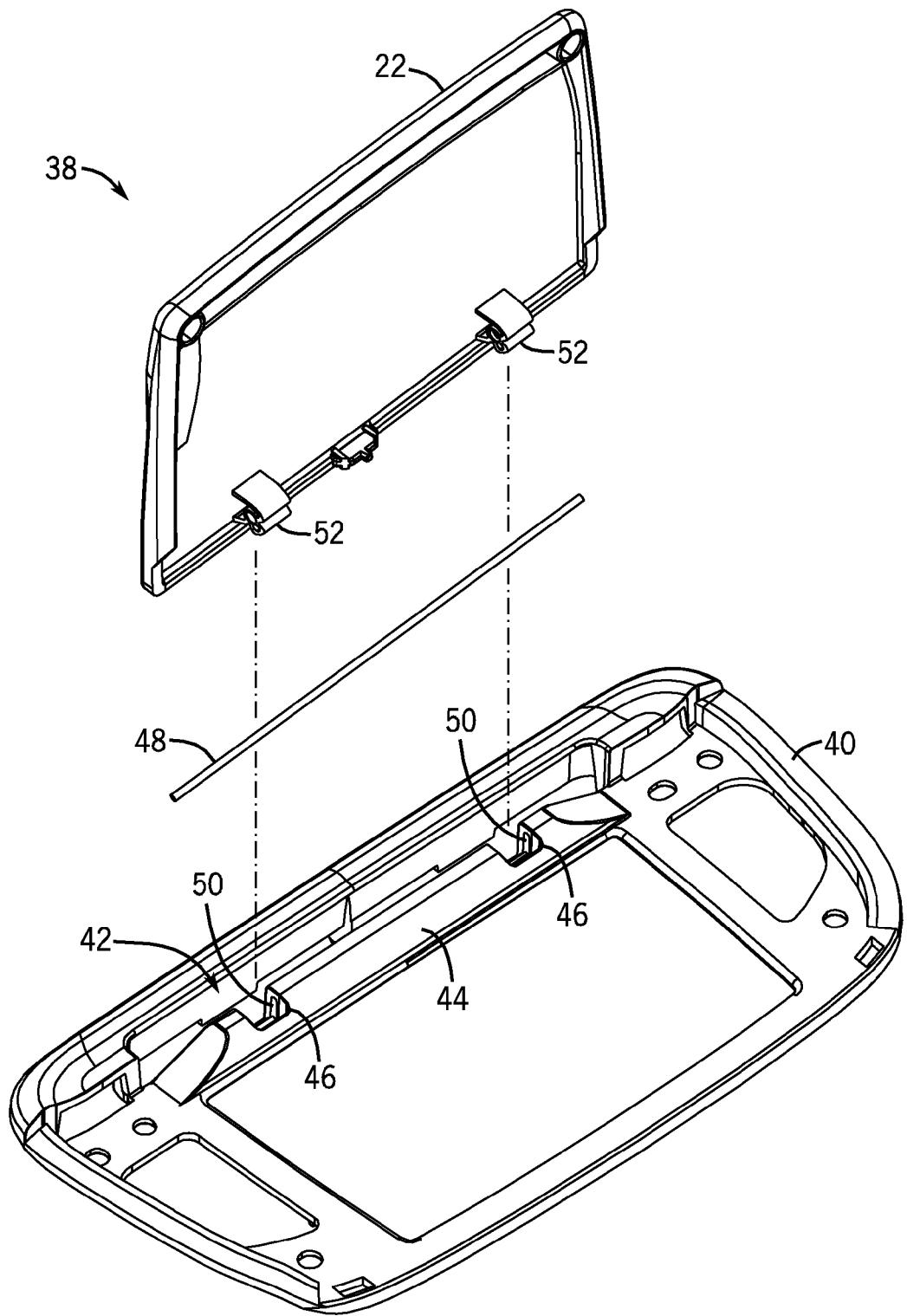
FIG. 5 is an exploded view of the vanity mirror assembly shown in FIG. 4.

FIG. 5 is an exploded view of the vanity mirror assembly 38 shown in FIG. 4. As illustrated, the hinge assembly 42 includes a vanity cover support 44 including two recesses 46. The hinge assembly 42 also includes a rotation axle 48 which may be disposed within a groove 50 of the cover support 44. Furthermore, the hinge assembly 42 includes a pair of cams 52 rigidly coupled to the vanity cover 22. As discussed in detail below, the axle 48 passes through openings within the cams 52, thereby securing the cover 22 to the cover support 44. For example, during assembly of the vanity mirror assembly 38, the openings within the cams 52 may be aligned with the groove 50 of the cover support 44. The axle 48 may then be inserted though the groove 50 and the openings to mount the cover 22 to the frame 40. In this manner, the axle 48 serves as a rotation axis for the cams 52 within the recesses 46. Furthermore, as discussed in detail below, the axle 48 may bias the cams 52 toward followers within the cover support 44. Because the cams 52 are contoured to induce rotation of the cover 22 toward the open and/or closed positions, the axle bias may serve to hold the cover 22 in the open and/or closed position, and/or facilitate the opening and/or closing operations. While two cams 52 and recesses 46 are shown in the present embodiment, it should be appreciated that more or fewer cams and recesses may be employed in alternative embodiments. For example, in certain configurations, 1, 2, 3, 4, 5, 6, or more cams 52 and recesses 46 may be utilized to secure the cover 22 to the frame 40 while facilitating rotation of the cover with respect to the frame.

Figure 6:
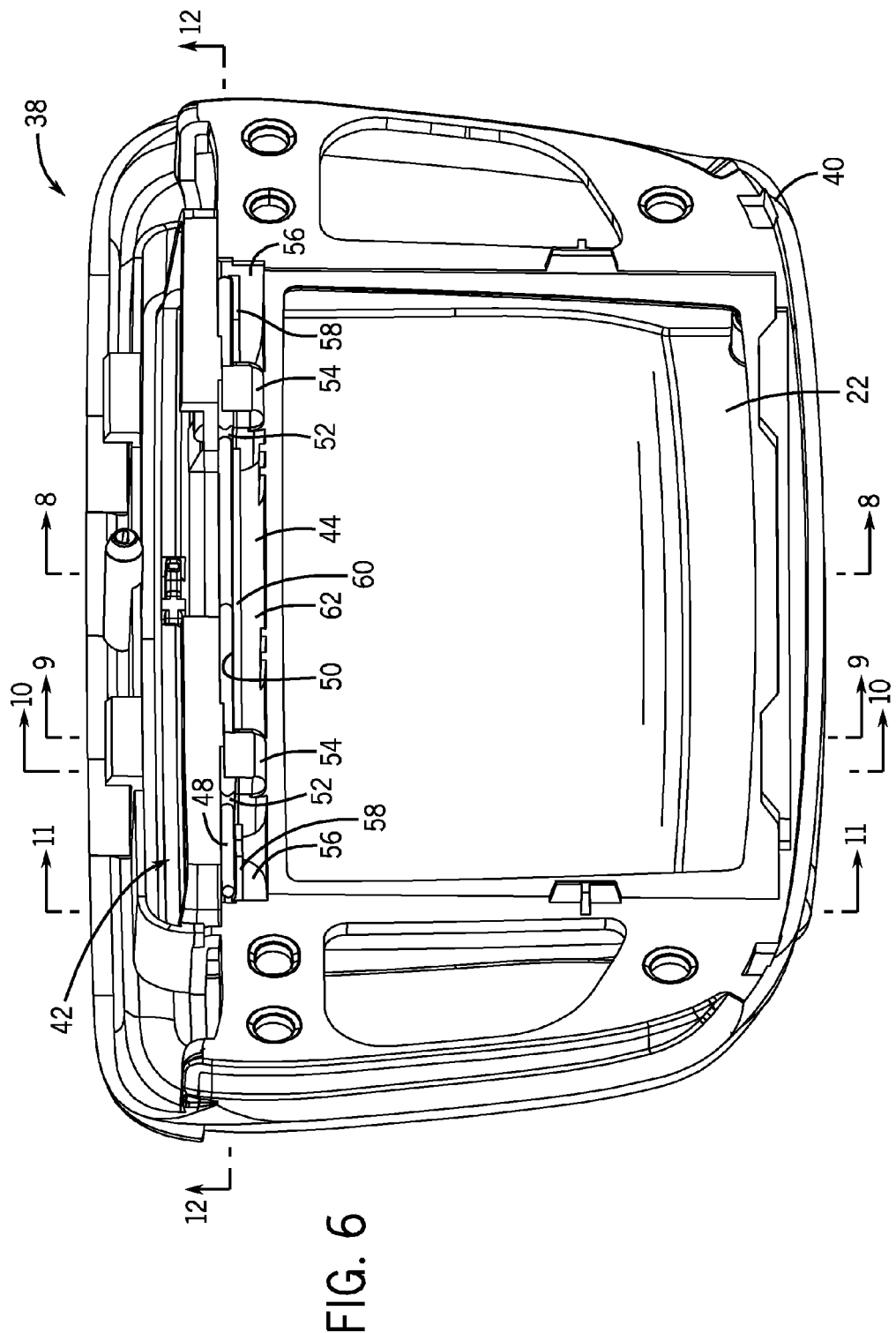
FIG. 6 is a rear perspective view of the vanity mirror assembly shown in FIG. 4.

FIG. 6 is a rear perspective view of the vanity mirror assembly 38 shown in FIG. 4. As illustrated, the axle 48 extends through the groove 50 within the cover support 44 and the cams 52 of the cover 22, thereby coupling the cover 22 to the frame 40. Furthermore, the cover support 44 includes follower assemblies 54 at the base of the recesses 46. The follower assemblies 54 are configured to support followers which engage the cams 52 to establish the biases toward the open and/or closed positions. In the present configuration, the cover support 44 includes end caps 56 having axle carriers 58. As discussed in detail below, the axle carriers 58 are configured to block horizontal movement of the axle 48 (e.g., movement along an axis extending from the top of the assembly 38 to the bottom), while the end caps 56 are configured to block longitudinal movement of the axle 48 (e.g., movement along the rotational axis 34). In addition, an axle carrier 60 within a center portion 62 of the cover support 44 facilitates insertion of the axle 48, while enabling the axle to move in the vertical direction (e.g., movement along an axis extending from the front of the assembly 38 to the rear).

In the present configuration, the axle 48 serves as a pivot about which the cover 22 may rotate. As discussed in detail below, the present embodiment facilitates a limited amount of vertical movement of the axle 48 within the groove 50 to enable the vertical position of the cams 52 to vary based on contact with the follower. Furthermore, due to the shape of the end caps 56, the axle 48 is bent into a curved profile. This curved profile establishes a bending moment within the axle 48 that biases the cams 52 toward the followers of the follower assemblies 54. In the present embodiment, contact between the followers and the cams 52 creates a rotational bias that urges the cover 22 to transition to the open position and/or the closed position.

Figure 7:
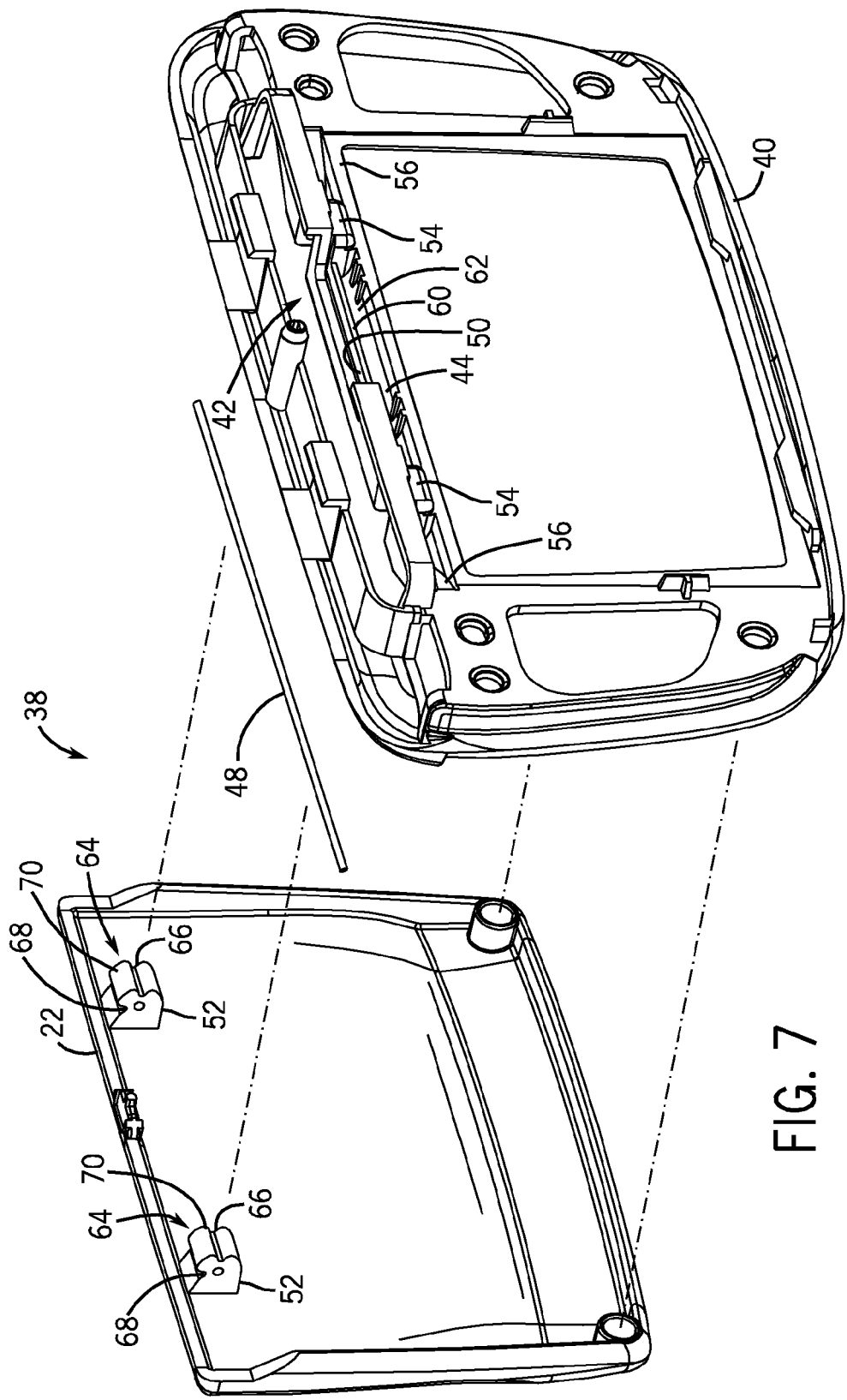
FIG. 7 is a rear exploded view of the vanity mirror assembly shown in FIG. 4.

FIG. 7 is a rear exploded view of the vanity mirror assembly 38 shown in FIG. 4. As illustrated, the axle 48 has been removed from the groove 50 such that the axle carrier 60 is clearly visible. As previously discussed, the openings within the cams 52 may be aligned with the groove 50 prior to insertion of the axle 48. In the present configuration, the axle 48 is substantially straight prior to being bent by the shape of the end caps 56. However, in alternative embodiments, the axle 48 may be pre-bent to establish a desired contact force between the followers and the cams 52.

As illustrated, the cams 52 include a bearing surface 64 configured to contact the followers of the follower assemblies 54. In the present configuration, the bearing surface 64 includes a first detent region 66, a second detent region 68 and a biasing region 70. As discussed in detail below, the first detent region 68 is configured to capture the follower, thereby holding the cover 22 in the closed position. As the occupant applies a sufficient moment to the cover 22 to induce the cover to rotate away from the closed position, the follower transitions to the biasing region 70. In the present configuration, the biasing region 70 includes a first portion configured to bias the cover toward the closed position, and a second portion configured to bias the cover toward the open position. The first portion is positioned adjacent to the first detent region 66, while the second portion is positioned adjacent to the second detent region 68. In this configuration, when the cover 22 is oriented closer to the closed position, the cover 22 is rotationally biased toward the closed position. Conversely, when the cover 22 is oriented closer to the open position, the cover 22 is rotationally biased toward the open position. Once the cover has been transitioned to the open position, the second detent region 68 captures the follower and holds the cover 22 in the open position. In this manner, the cover may be held in a desired position despite movement experienced by the vehicle 10 during operation. Furthermore, the biasing region 70 may serve to automatically transition the cover 22 to the open or closed position to reduce the possibility of the cover 22 remaining within an intermediate position.

Figure 8:
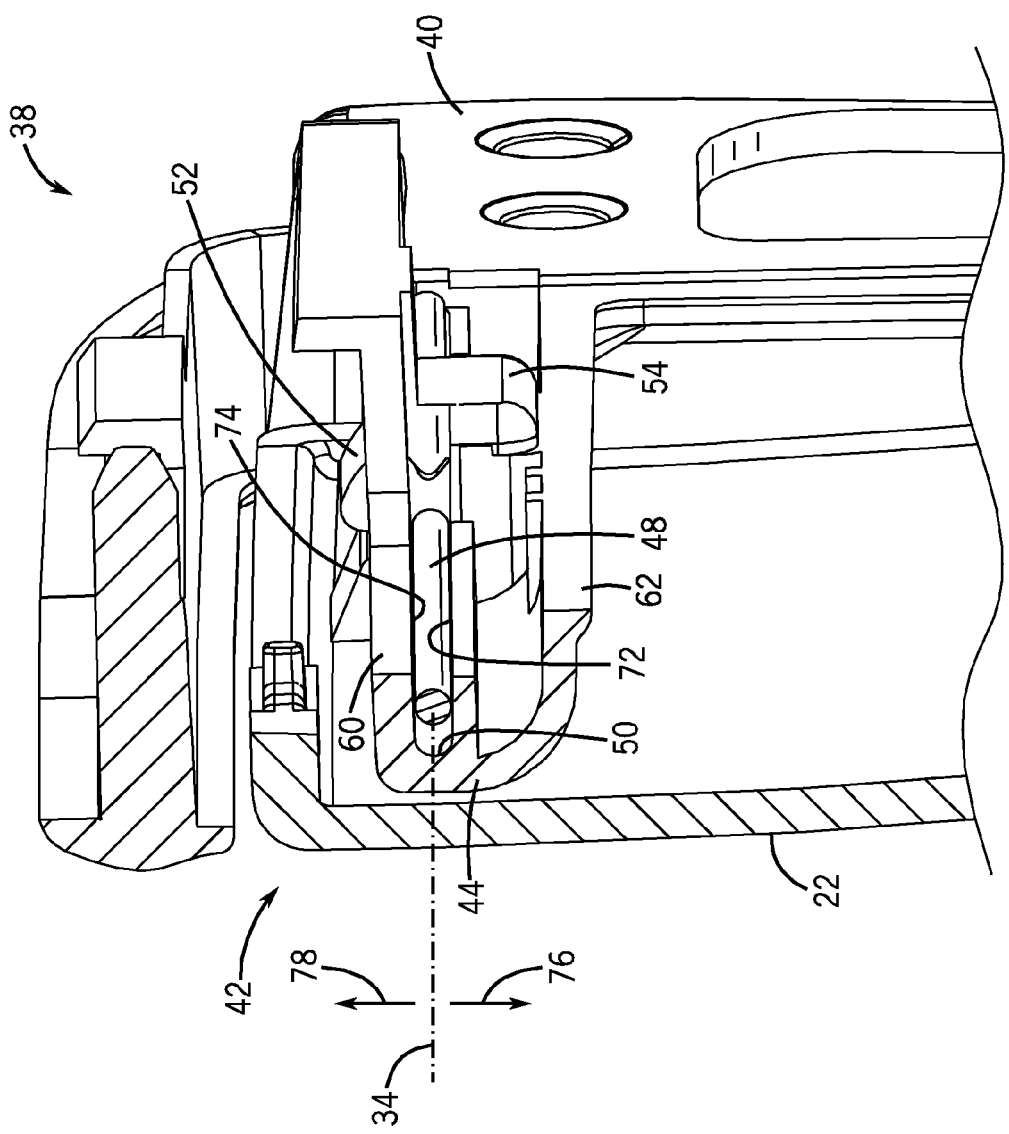
FIG. 8 is a cross-sectional perspective view of the vanity mirror assembly, taken along line 8-8 of FIG. 6.

FIG. 8 is a cross-sectional perspective view of the vanity mirror assembly 38, taken along line 8-8 of FIG. 6. As illustrated, the axle 48 is disposed within the groove 50 to facilitate rotation of the vanity cover 22 with respect to the frame 40. As previously discussed, horizontal movement of the axle 48 is blocked by contact between the axle 48 and the axle carrier 60. Specifically, the axle carrier 60 includes a first surface 72 and a second surface 74 disposed on opposite horizontal sides of the axle 48. Consequently, contact between the axle 48 and the first surface 72 blocks horizontal movement of the axle 48 along a direction 76, and contact between the axle 48 and the second surface 74 blocks horizontal movement of the axle 48 along a direction 78. However, as discussed in detail below, the axle carrier 60 is configured to enable vertical movement in directions substantially perpendicular to directions 76 and 78.

Figure 9:
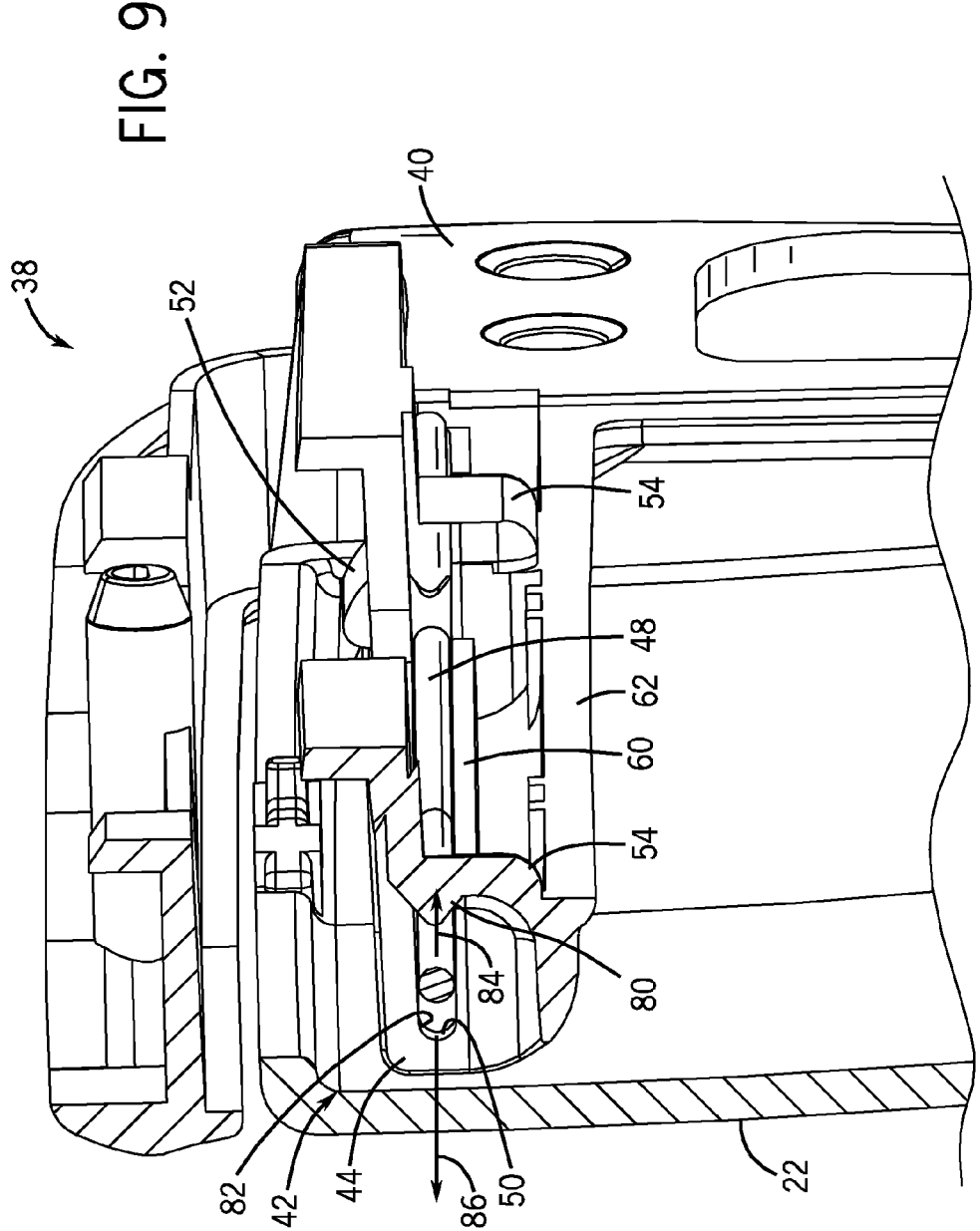
FIG. 9 is a cross-sectional perspective view of the vanity mirror assembly, taken along line 9-9 of FIG. 6.

FIG. 9 is a cross-sectional perspective view of the vanity mirror assembly 38, taken along line 9-9 of FIG. 6. As illustrated, a follower 80 is coupled to the follower assembly 54. As previously discussed, the follower 80 is configured to engage the bearing surface 64 of the cam 52 to bias the cover 22 toward the open and/or closed positions. In the present configuration, the groove 50 extends to the recess 46, thereby forming an axle support 82 adjacent to the cam 52. The axle support 82 enables vertical movement of the axle 48 in the directions 84 and 86. Because the axle 48 is coupled to the cam 52, the support 82 facilitates movement of the axle 48 in the vertical direction. For example, as the axle 48 biases the cam 52 toward the follower 80, rotation of the cam 52 induces the cam 52 to move in the direction 84 and/or 86 based on the profile of the bearing surface 64. As previously discussed, the cam 52 may serve to hold the cover 22 in the open position, hold the cover 22 in the closed position, or bias the cover toward the open or closed position based on the region of the bearing surface 64 which contacts the follower 80. In the present embodiment, the biasing force induced by the axle 48 provides a sufficient contact force between the bearing surface and the follower 80 to induce the rotational biases and/or hold the cover in the desired position.

Figure 10:
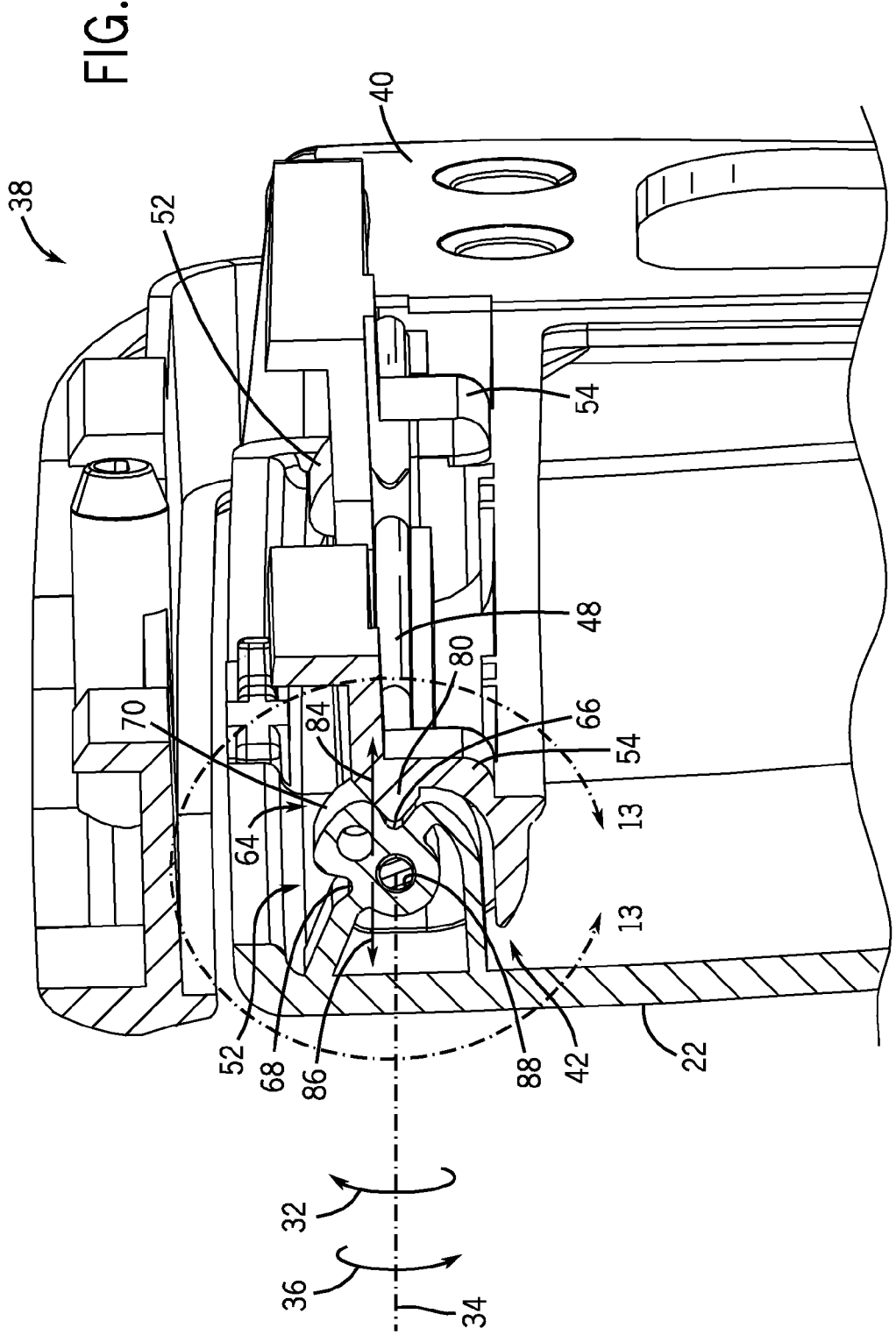
FIG. 10 is a cross-sectional perspective view of the vanity mirror assembly, taken along line 10-10 of FIG. 6.

FIG. 10 is a cross-sectional perspective view of the vanity mirror assembly 38, taken along line 10-10 of FIG. 6. As illustrated, the axle 48 passes through an opening 88 within the cam 52 thereby enabling the cam 52 to rotate with respect to the follower 80, and biasing the cam 52 toward the follower 80 in the vertical direction 84. In the illustrated closed position, the follower 80 is positioned within the first detent region 66. Consequently, rotation of the cam 52 relative to the follower 80 is blocked by contact between the surfaces of the first detent region 66 and the follower 80. To rotate the cover 22 toward the open position, an occupant may apply a force to the cover 22 to establish a moment sufficient to rotate the cam 52 in the direction 36. Specifically, rotation of the cam 52 about the axle 48 will induce the cam 52 to translate in the vertical direction 86 against the axle bias in the direction 84 due to contact between the follower 80 and the surfaces of the first detent region 66. As the cam 52 moves in the direction 86 and rotates in the direction 36, the follower 80 transitions to the biasing region 70 of the bearing surface 64. As previously discussed, the biasing region 70 includes a first portion adjacent to the first detent region 66 and a second portion adjacent to the second detent region 68. While the follower 80 contacts the first portion, the force induced by the axle 48 in the direction 84 will be redirected by the first portion to urge the cam 52 to rotate in the direction 32, thereby biasing the cover 22 toward the closed position. Conversely, while the follower 80 contacts the second portion, the force induced by the axle 48 in the direction 84 will be redirected by the second portion to urge the cam 52 to rotate in the direction 36, thereby biasing the cover 22 toward the open position. Once the cover 22 has rotated to the closed position, the follower 80 will engage the second detent region 68, thereby holding the cover 22 in the closed position.

Figure 11:
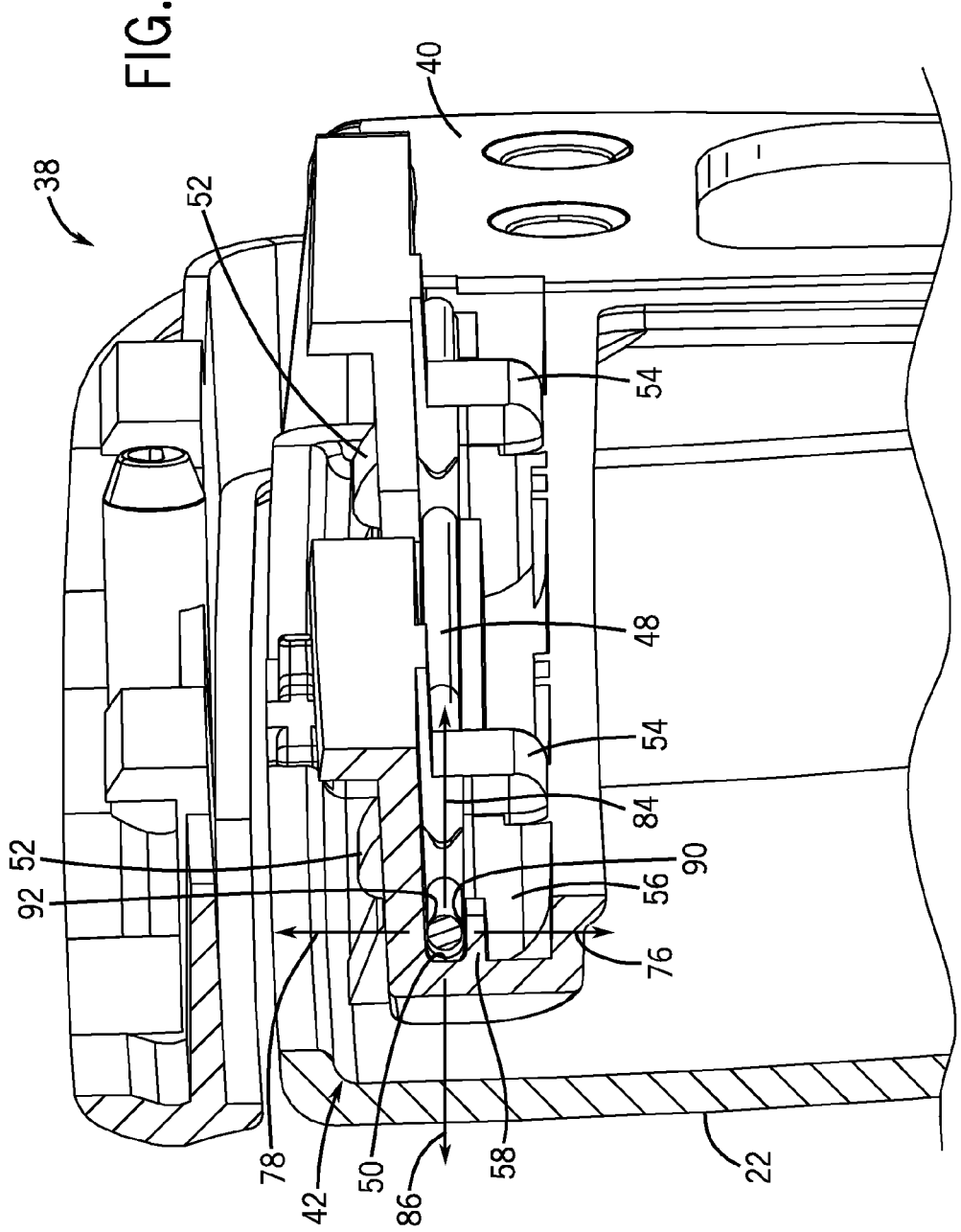
FIG. 11 is a cross-sectional perspective view of the vanity mirror assembly, taken along line 11-11 of FIG. 6.

FIG. 11 is a cross-sectional perspective view of the vanity mirror assembly 38, taken along line 11-11 of FIG. 6. As illustrated, the axle 48 is disposed within the groove 50 to facilitate rotation of the vanity cover 22 with respect to the frame 40. As previously discussed, horizontal movement of the axle 48 is blocked by contact between the axle 48 and the axle carrier 58. Specifically, the axle carrier 58 includes a first surface 90 and a second surface 92 disposed on opposite horizontal sides of the axle 48. Consequently, contact between the axle 48 and the first surface 90 blocks horizontal movement of the axle 48 along the direction 76, and contact between the axle 48 and the second surface 92 blocks horizontal movement of the axle 48 along the direction 78. In addition, longitudinal movement of the axle 48 is blocked by contact between the end of the axle 48 and the inner surface of the end cap 56. As discussed in detail below, contact between the end cap 56 and the axle 48 induces the axle 48 to bend downward in the vertical direction 84, thereby applying a downward force on the cam 52 and establishing the axle bias.

Figure 12:
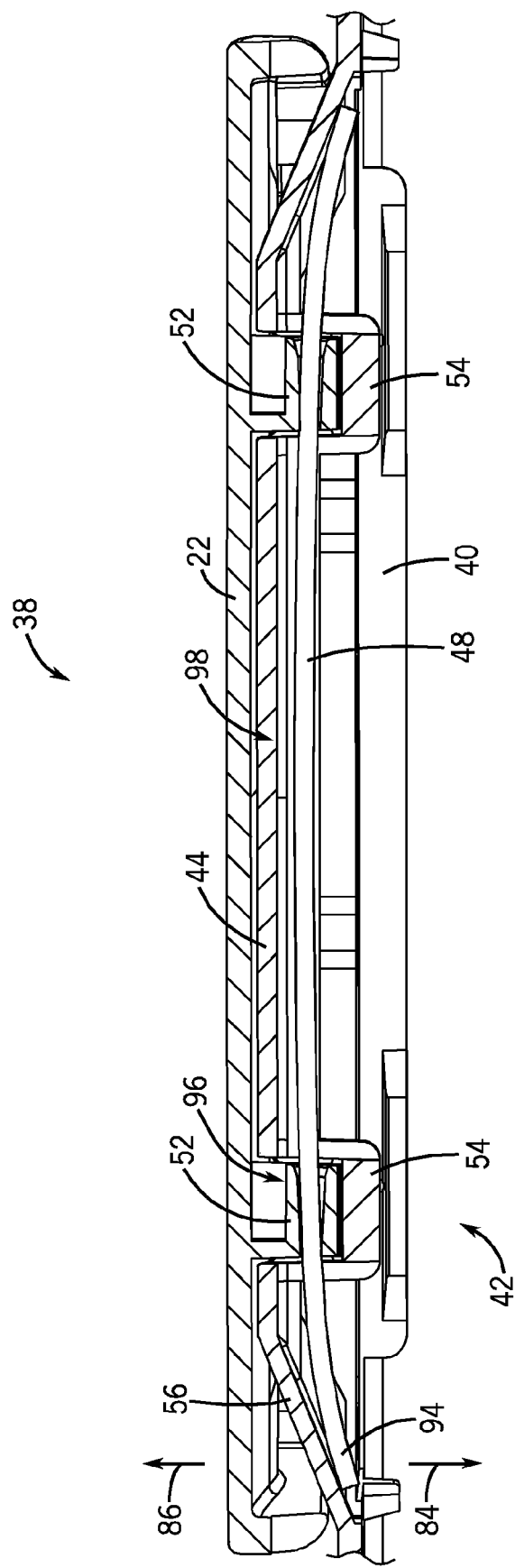
FIG. 12 is a cross-sectional view of the vanity mirror assembly, taken along line 12-12 of FIG. 6.

FIG. 12 is a cross-sectional view of the vanity mirror assembly 38, taken along line 12-12 of FIG. 6. As illustrated, the axle 48 extends through the cams 52 and the cover support 44, thereby securing the cover 22 to the frame 40. In addition, contact between the cams 52 and the surrounding structure of the cover support 44 blocks movement of the cover 22 along the longitudinal axis of the axle 48. However, as previously discussed, the cover 22 may translate in the vertical direction 84 and/or 86 as the bearing surface 64 of the cam 52 rotates along the follower 80.

As previously discussed, the shape of the end caps 56 induces the axle 48 to bend downward in the direction 84 at the ends. As illustrated, contact between an end portion 94 of the axle 48 and the end cap 56 forces the end portion 94 downward, thereby biasing a portion 96 of the axle 48 in contact with the cam 52 in the downward direction 84. As will be appreciated, the downward force from the axle portion 96 urges the cam 52 toward the follower, thereby providing the force which holds the cover 22 in the open and/or closed positions, and establishes the rotational biases. As discussed in detail below, when the cam 52 rotates, the axle may be driven upwards in the direction 86. Because the axle is supported at both ends, the upward motion is resisted by the downward bias of the bent axle 48. In addition, as the axle 48 bends, the center portion 98 is biased upward. Consequently, in the present embodiment, the cams 52 and follower supports 54 are positioned toward the ends 94 of the axle 48 to utilize the downward bias.

As will be appreciated, the magnitude of the downward bias may be varied by adjusting the properties of the axle 48 and/or cover support 44. For example, the thickness of the axle 48 will affect the resistance to bending. Consequently, a thicker axle 48 will apply a greater downward force than a thinner axle 48. In addition, the length, area moment of inertial, material properties, wear, among other factors, may also affect the force applied by the axle 48 to the cams 52. In addition, as previously discussed, the position of the cams 52 may affect the force applied by the axle. For example, cams 52 positioned closer to the ends 94 may experience a greater downward force than cams positioned closer to the center 98. Furthermore, the shape of the end caps 56 may alter the axle force. For example, the downward force may be dependent on the slope of the end caps 56 adjacent to the axle 48. While the ends 94 of the axle 48 are not fixed to the end caps 56 in the present embodiment, it should be appreciated that alternative embodiments may employ end caps 56 which rigidly attach to the ends 94 of the axle 48. Such configurations may alter the bending profile of the axle 48, thereby affecting the torque profile of the hinge assembly 42.

Figure 13:
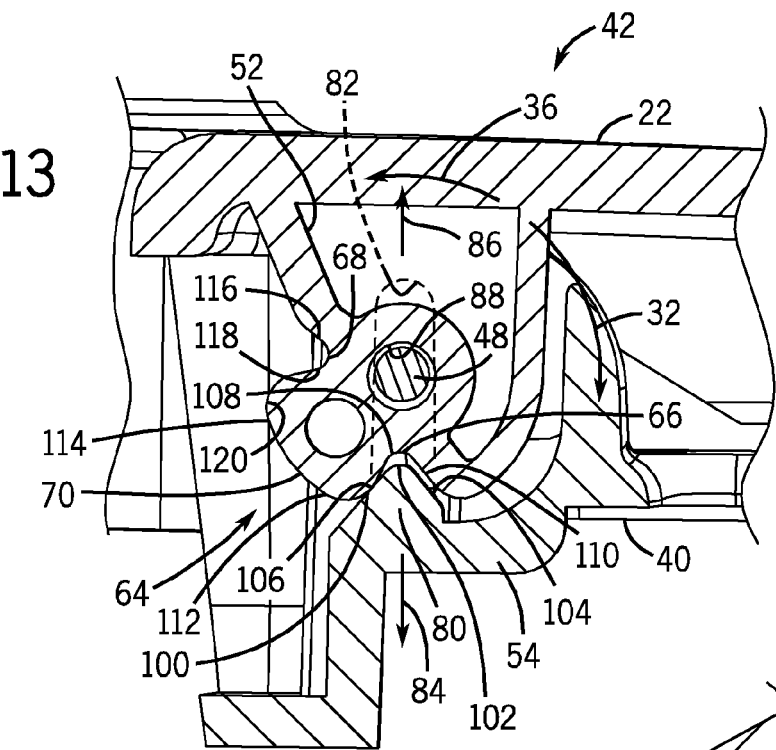
FIG. 13 is a cross-sectional view of the vanity mirror assembly, taken within line 13-13 of FIG. 10, in which the vanity mirror cover is in a closed position.

FIG. 13 is a cross-sectional view of the vanity mirror assembly 38, taken within line 13-13 of FIG. 10, in which the vanity mirror cover 22 is in a closed position. As previously discussed, the first detent region 66 is configured to capture the follower 80 to hold the cover 22 in the closed position. As illustrated, the follower 80 includes a first contact surface 100, a tip portion 102 and a second contact surface 104. Correspondingly, the first detent region 66 includes a first contact surface 106, a tip portion 108 and a second contact surface 110. As will be appreciated, contact between the first contact surface 100 of the follower 80 and the first contact surface 106 of the first detent region 66 blocks rotation of the cover 22 in the direction 36. Similarly, contact between the second contact surface 104 of the follower 80 and the second contact surface 110 of the first detent region 66 may block movement of the cover 22 in the direction 32. However, in certain embodiments, the vanity cover assembly includes certain features configured to limit rotation in the direction 32 once the cover has reached the closed position.

While the follower 80 is captured by the first detent region 66, the cover 22 is in a stable position. In other words, any slight rotation of the cover 22 in the direction 32 or 36 will cause the cover 22 to return to the closed position. Consequently, the cover 22 may be held in the illustrated closed position despite vibration and other forces and moments that may be applied to the sun visor 20 during operation of the vehicle 10. To open the cover 22, the occupant may apply a force to the cover 22 inducing the cam 52 to rotate in the direction 36. Specifically, as the cam 52 rotates, contact between the first contact surface 106 of the first detent region 66 and the first contact surface 100 of the follower 80 drives the cam 52 upward in the vertical direction 86 against the downward bias of the axle 48. As will be appreciated, the force sufficient to induce the cover 22 to rotate away from the closed position may be dependent on the downward force of the axle 48, the shape of the first contact surface 100 of the follower 80 and/or the shape of the first contact surface 106 of the first detent region 66.

Figure 14:
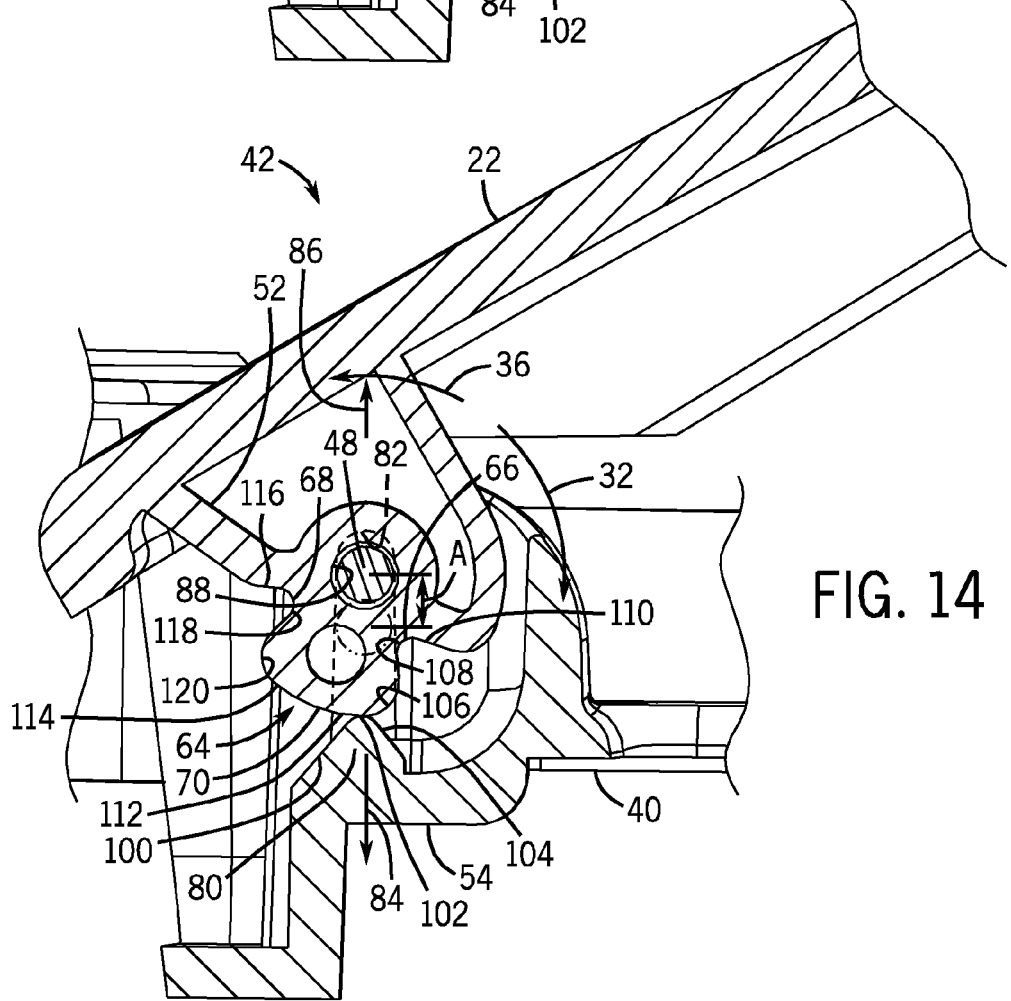
FIG. 14 is a cross-sectional view of the vanity mirror assembly, as shown in FIG. 13, in which the vanity mirror cover is in a partially closed position.

FIG. 14 is a cross-sectional view of the vanity mirror assembly 38, as shown in FIG. 13, in which the vanity mirror cover 22 is in a partially closed position. As illustrated, while in the partially closed position, the axle 48 has translated upward within the axle support 82 from the position illustrated in FIG. 13. Specifically, the axle has moved a distance A along the vertical direction 86, thereby acting against the downward bias of the axle 48. As an occupant rotates the cover 22 toward the open position, the follower 80 will disengage the first detent portion 66 and contact the biasing region 70. As a result, the tip 102 of the follower 80 will contact a first portion 112 of the biasing region 70. Due to the contour of the first portion 112, force applied by the axle 48 in the downward direction 84 is redirected to induce a rotation of the cam 52 in the direction 32, i.e., toward the closed position. Consequently, in the presently illustrated orientation, the cover 22 is in an unstable position. Therefore, if an occupant transitioning the cover 22 toward the open position releases the cover 22, the cover will transition back toward the closed position. Furthermore, if an occupant is in the process of closing the cover 22, the occupant may release the cover 22, and the cover 22 will transition toward the closed position automatically. The rotational bias in the direction 32 caused by the downward force of the axle 48 is at least partially dependent on the shape of the first portion 112 of the biasing region 70. Therefore, the rotational bias may be adjusted by altering the shape of the first portion 112.

Figure 15:
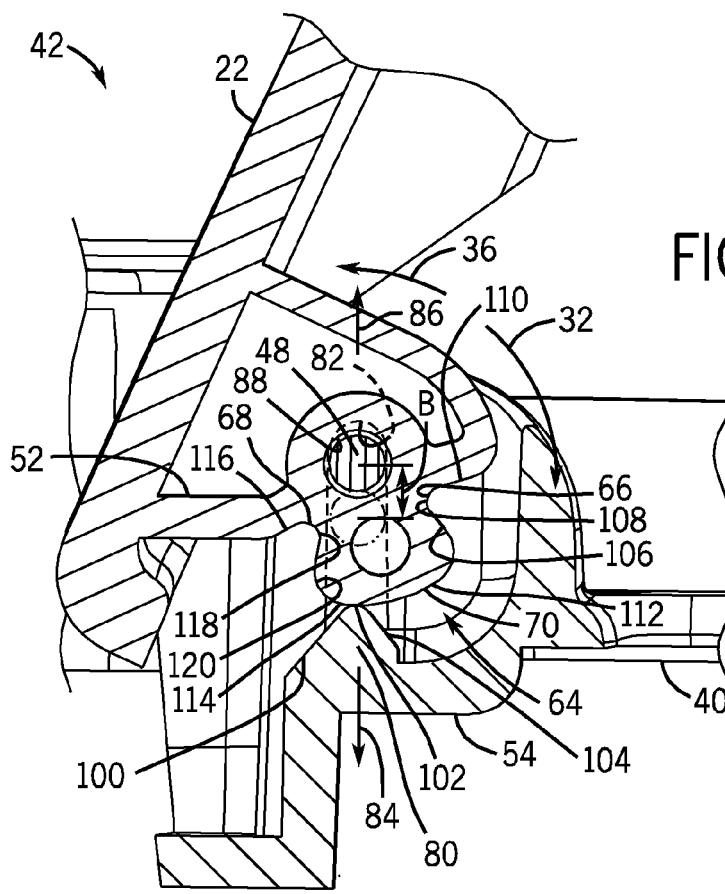
FIG. 15 is a cross-sectional view of the vanity mirror assembly, as shown in FIG. 13, in which the vanity mirror cover is in a partially open position.

FIG. 15 is a cross-sectional view of the vanity mirror assembly 38, as shown in FIG. 13, in which the vanity mirror cover 22 is in a partially open position. As illustrated, while in the partially open position, the axle 48 is positioned a distance B along the vertical direction 86 from the position illustrated in FIG. 13. As an occupant continues to rotate the cover 22 toward the open position, the tip 102 of the follower 80 will transition between contact with the first portion 112 of the biasing region 70 to contact with a second portion 114. Due to the contour of the second portion 114, force applied by the axle 48 in the downward direction 84 is redirected to induce a rotation of the cam 52 in the direction 36, i.e., toward the open position. Consequently, in the presently illustrated orientation, the cover 22 is in an unstable position. Therefore, if an occupant transitioning the cover 22 toward the open position releases the cover 22, the cover will automatically transition toward the open position. Furthermore, if an occupant is in the process of closing the cover 22 and releases the cover 22 at the illustrated orientation, the cover 22 will transition back to the open position. The rotational bias in the direction 36 caused by the downward force of the axle 48 is at least partially dependent on the shape of the second portion 114 of the biasing region 70. Therefore, the rotational bias may be adjusted by altering the shape of the second portion 114. As will be appreciated, the biasing region 70 may include a portion between the first portion 112 and the second portion 114 that produces substantially no rotational bias when contacted by the follower 80.

Figure 16:
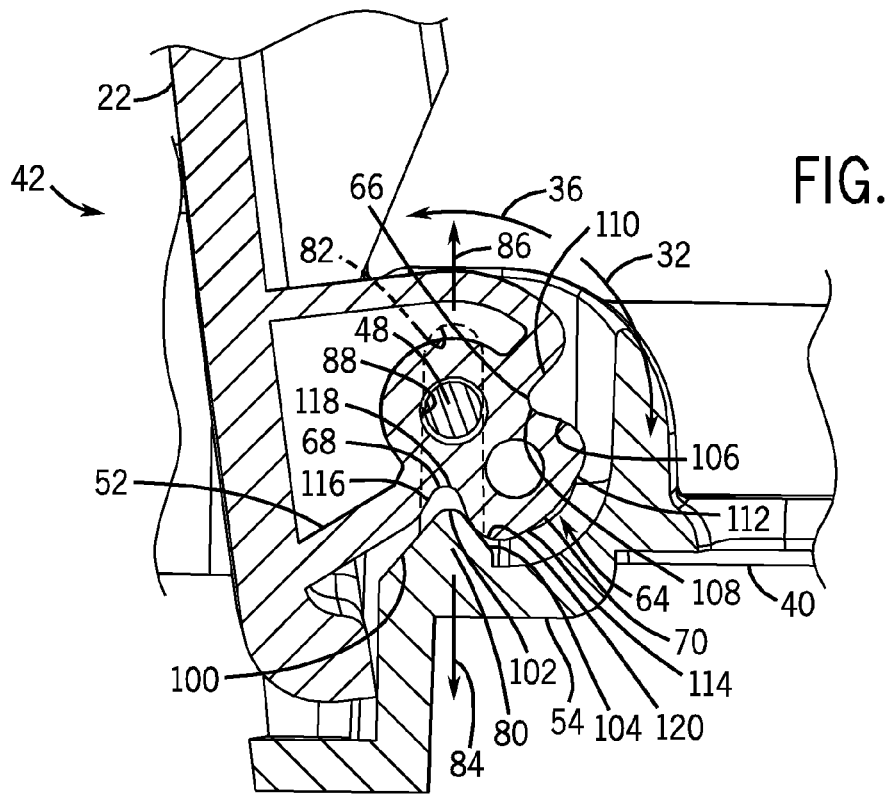
FIG. 16 is a cross-sectional view of the vanity mirror assembly, as shown in FIG. 13, in which the vanity mirror cover is in an open position.

FIG. 16 is a cross-sectional view of the vanity mirror assembly, as shown in FIG. 13, in which the vanity mirror cover is in an open position. As previously discussed, the second detent region 68 is configured to capture the follower 80 to hold the cover 22 in the open position. As illustrated, the second detent region 68 includes a first contact surface 116, a tip portion 118 and a second contact surface 120. As will be appreciated, contact between the first contact surface 100 of the follower 80 and the first contact surface 116 of the second detent region 68 blocks rotation of the cover 22 in the direction 32. Similarly, contact between the second contact surface 104 of the follower 80 and the second contact surface 120 of the second detent region 68 may block movement of the cover 22 in the direction 36. However, in certain embodiments, the vanity cover assembly includes certain features configured to limit rotation in the direction 36 once the cover has reached the open position.

While the follower 80 is captured by the second detent region 68, the cover 22 is in a stable position. In other words, any slight rotation of the cover 22 in the direction 32 or 36 will cause the cover 22 to return to the open position. Consequently, the cover 22 may be held in the illustrated open position despite vibration and other forces and moments that may be applied to the sun visor 20 during operation of the vehicle 10. To close the cover 22, the occupant may apply a force to the cover 22 inducing the cam 52 to rotate in the direction 32. Specifically, as the cam 52 rotates, contact between the second contact surface 120 of the second detent region 68 and the second contact surface 104 of the follower 80, drives the cam 52 upward in the vertical direction 86 against the downward bias of the axle 48. As will be appreciated, the force sufficient to induce the cover 22 to rotate away from the open position may be dependent on the downward force of the axle 48, the shape of the second contact surface 104 of the follower 80 and/or the shape of the second contact surface 120 of the second detent region 68.

While the present embodiment includes two detent regions 66 and 68, it should be appreciated that alternative embodiments may include more or fewer regions. For example, certain embodiments may include 0, 1, 2, 3, 4, 5, 6, or more regions depending on the number of desired detent positions. Furthermore, the shape of the surfaces within the follower 80 and/or the bearing surface 64 may be varied to adjust the torque profile of the hinge assembly 42. For example, the shape of the follower surfaces may be varied to increase or decrease the force sufficient to transition the cover away from the open and/or closed positions. Similarly, the shape of the detent region surfaces may be altered to vary the force holding the cover 22 in the open and/or closed positions. In addition, the shape of the biasing region 70 may be varied to adjust the rotational bias toward the open and/or closed positions. For example, in certain configurations, the biasing region may apply substantially no rotational bias to the cover 22. In further embodiments, the cam 52 may be coupled to the frame 40, while the follower 80 and axle 48 are coupled to the cover 22. Such a configuration may function in a similar manner to the embodiments described above. Furthermore, while the hinge assembly 42 is described above with reference to a visor 20, it should be appreciated that the hinge assembly 42 may be employed within other machines or devices having two surfaces that rotate with respect to one another.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle interior trim component hinge assembly, comprising:
   a follower;
   a cam disposed adjacent to the follower, wherein the cam is configured to translate relative to the follower along a translational direction and to rotate relative to the follower about a rotational axis; and
   an axle disposed through the cam to facilitate rotation of the cam about the rotational axis, wherein the axle is bent along the entire length thereof and configured to further bend in response to rotation of the cam to establish a force in the translational direction that urges the cam toward the follower; and
   end caps configured to secure respective end portions of the axle in a downward position relative to the follower along the translational direction.

2. The vehicle interior trim component hinge assembly of claim 1, wherein a portion of the cam is contoured such that contact between the follower and the cam induces the cam to rotate.

3. The vehicle interior trim component hinge assembly of claim 2, wherein the cam is contoured such that contact between the follower and a first portion of the cam induces the cam to rotate in a first direction, and contact between the follower and a second portion of the cam induces the cam to rotate in a second direction, opposite the first direction.

4. The vehicle interior trim component hinge assembly of claim 1, wherein the cam comprises at least one detent region having detent surfaces configured to capture the follower and bias the cam toward an orientation aligned with the detent region.

5. The vehicle interior trim component hinge assembly of claim 4, comprising a plurality of detent regions positioned about a circumference of the cam.

6. The vehicle interior trim component hinge assembly of claim 3, wherein the cam comprises a first detent region adjacent to the first portion along the first direction, and a second detent region adjacent to the second portion along the second direction, wherein the first and second detent regions include detent surfaces configured to capture the follower and bias the cam toward an orientation aligned with the respective detent region.

7. The vehicle interior trim component hinge assembly of claim 1, comprising an axle support configured to enable the axle to translate in the translational direction relative to the follower while blocking movement of the axle in a crosswise direction, substantially perpendicular to the translational direction.

8. The vehicle interior trim component hinge assembly of claim 1, comprising a plurality of followers and a corresponding plurality of cams, wherein the axle is disposed through each cam to facilitate rotation of each cam about the respective rotational axis.

9. A vehicle interior trim component hinge assembly, comprising:
a follower;
a cam disposed adjacent to the follower, wherein the cam is configured to translate relative to the follower along a translational direction and to rotate relative to the follower about a rotational axis; and
an axle disposed through the cam to facilitate rotation of the cam about the rotational axis, wherein the axle is bent along the entire length thereof and configured to further bend in response to rotation of the cam to establish a force in the translational direction that urges the cam toward the follower; and
end caps configured to secure respective end portions of the axle in a downward position relative to the follower along the translational direction.

10. The vehicle interior trim component hinge assembly of claim 9, wherein the bearing surface is contoured such that contact between the follower and a first portion of the bearing surface induces the cam to rotate in a first direction, and contact between the follower and a second portion of the bearing surface induces the cam to rotate in a second direction, opposite the first direction.

11. The vehicle interior trim component hinge assembly of claim 9, wherein the bearing surface comprises at least one detent region having detent surfaces configured to capture the follower and bias the cam toward an orientation aligned with the detent region.

12. The vehicle interior trim component hinge assembly of claim 9, comprising an axle support configured to enable the axle to translate in the translational direction relative to the follower while blocking movement of the axle in a crosswise direction, substantially perpendicular to the translational direction.

13. The vehicle interior trim component hinge assembly of claim 9, wherein the cam is rigidly coupled to a first surface and the follower is rigidly coupled to a second surface such that rotation of the cam about the rotational axis induces the first surface to rotate relative to the second surface.

14. A vehicle interior trim component hinge assembly, comprising:
a follower;
a cam having an opening positioned about a rotational axis of the cam, and a bearing surface configured to contact the follower;
a cam disposed adjacent to the follower, wherein the cam is configured to translate relative to the follower along a translational direction and to rotate relative to the follower about a rotational axis; and
an axle disposed through the cam to facilitate rotation of the cam about the rotational axis, wherein the axle is bent along the entire length thereof and configured to further bend in response to rotation of the cam to establish a force in the translational direction that urges the cam toward the follower; and
end caps configured to secure respective end portions of the axle in a downward position relative to the follower along the translational direction.

15. The vehicle interior trim component hinge assembly of claim 14, wherein a portion of the bearing surface is contoured such that contact between the follower and the bearing surface induces the cam to rotate.

16. The vehicle interior trim component hinge assembly of claim 15, wherein the bearing surface is contoured such that contact between the follower and a first portion of the bearing surface induces the cam to rotate in a first direction, and contact between the follower and a second portion of the bearing surface induces the cam to rotate in a second direction, opposite the first direction.

17. The vehicle interior trim component hinge assembly of claim 14, wherein the bearing surface comprises at least one detent region having detent surfaces configured to capture the follower and bias the cam toward an orientation aligned with the detent region.

18. The vehicle interior trim component hinge assembly of claim 16, wherein the bearing surface comprises a first detent region adjacent to the first portion along the first direction, and a second detent region adjacent to the second portion along the second direction, wherein the first and second detent regions include detent surfaces configured to capture the follower and bias the cam toward an orientation aligned with the respective detent region.

19. The vehicle interior trim component hinge assembly of claim 14, comprising a plurality of followers and a corresponding plurality of cams, wherein the axle is disposed through the opening of each cam to facilitate rotation of each cam about the respective rotational axis.

20. The vehicle interior trim component hinge assembly of claim 9, comprising end caps configured to secure respective end portions of the axle in a downward position relative to the follower along the translational direction.

* * * * *